Dec. 13, 1966 J. W. EUSTANCE 3,292,061
ELECTRICAL CAPACITOR WITH A POLYPHENYLENE ETHER DIELECTRIC
Filed Aug. 13, 1963 2 Sheets-Sheet 1
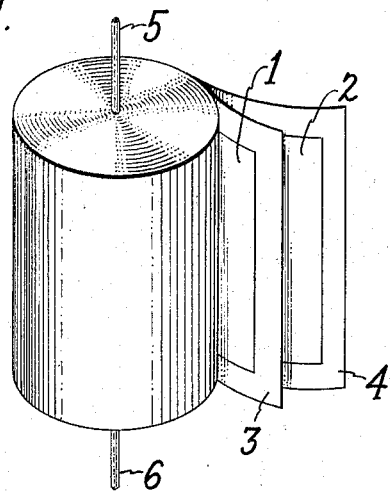
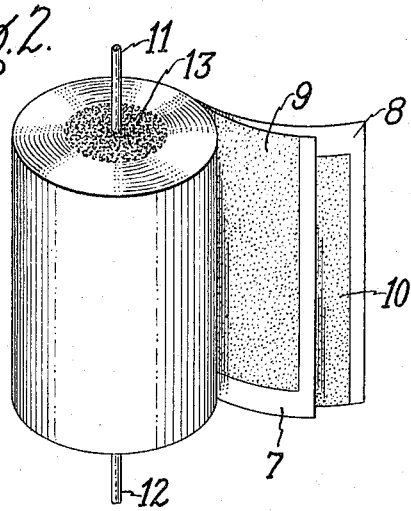
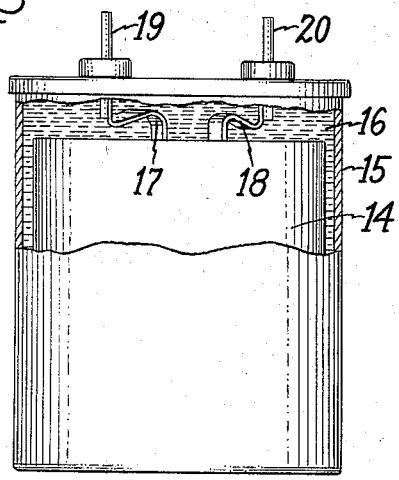
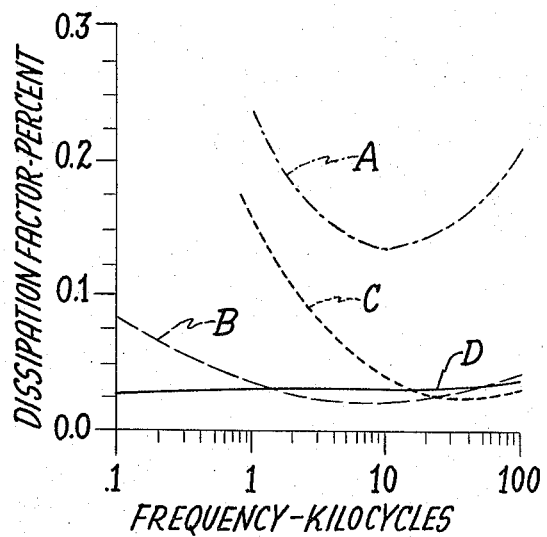
Inventor,
John W. Eustance,
by Sidney Greenberg
His Attorney.

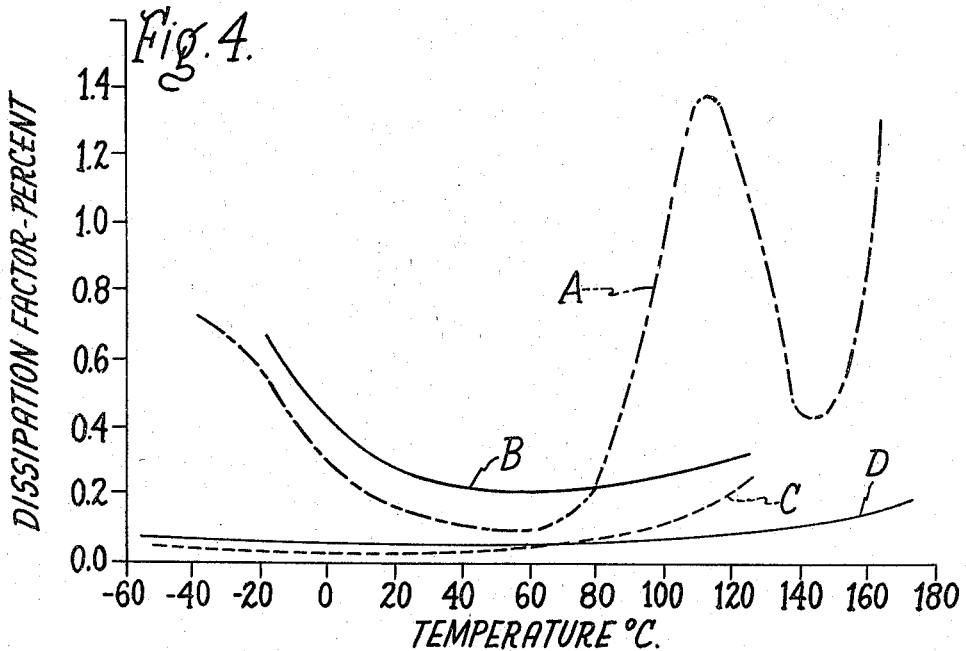
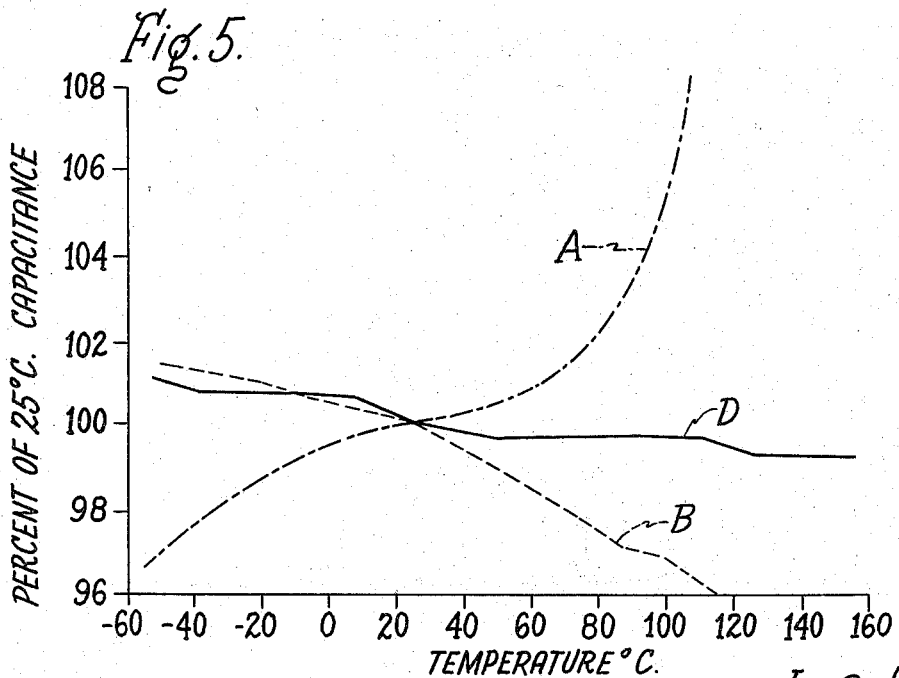

United States Patent Office 3,292,061
Patented Dec. 13, 1966

3,292,061
ELECTRICAL CAPACITOR WITH A POLYPHENYL-
ENE ETHER DIELECTRIC
John W. Eustance, Glens Falls, N.Y., assignor to General
Electric Company, a New York corporation
Filed Aug. 13, 1963, Ser. No. 301,763
18 Claims. (Cl. 317—258)

The present invention relates to electrical capacitors, and more particularly to electrical capacitors incorporating dielectric resin material which confers improved electrical properties thereon, especially under conditions of elevated temperature.

As well known in the art, dielectric material of low power factor is desirable for use in capacitors to avoid energy loss and excessive heat generation in the capacitor which otherwise would cause undue shortening of the life of the capacitor. While various types of dielectric materials are known which may have satisfactory power factor properties at normal operating temperatures, the conventional dielectrics do not retain their low power factors under conditions of elevated temperature, e.g., 80–100° C. and above, and known capacitor dielectric materials of synthetic resin type do not in general have a sufficiently high softening point to enable them to be used under elevated temperatures up to 200° C. and higher to which electrical capacitors may be subjected under operating conditions. As a result, known dielectric resin materials have exhibited poor stability of electrical properties with variations in temperature, and under variable frequencies, and they have led to premature failure of capacitors in which they are incorporated under conditions of high temperature.

It is an object of the invention to provide electrical capacitors with dielectric material, especially in the form of spacer films of synthetic resin composition, which confer improved electrical properties thereon, especially low power factor under conditions of elevated temperature and stability of electrical properties over a wide range of temperature.

It is another object of the invention to provide capacitors with a synthetic resin dielectric material in the form of coatings, films and the like which impart the above-mentioned improved properties to the capacitors.

Other objects and advantages will become apparent from the following description and the accompanying claims.

With the above objects in view, the present invention relates to an electrical capacitor comprising a pair of electrodes separated by dielectric material comprising a polyphenylene ether having a repeating structural unit of the formula

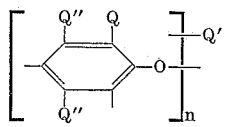

wherein the oxygen atom of one unit is connected to the benzene nucleus of the adjoining unit, $n$ is a positive integer and at least about 100, Q is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of a tertiary α-carbon atom, and halohydrocarbonoxy radicals having at least two carbon atoms between the halogen atom and phenol nucleus and being free of a tertiary α-carbon atom, and Q' and Q'' are both monovalent substituents which are the same as Q and in addition halogen.

In a preferred form of the invention, the dielectric material comprises a polyphenylene ether composed of poly (2,6-dimethylphenylene-1,4) ether having a molecular weight of at least about 10,000.

The invention will be better understood from the following description taken in conjunction with the accompanying drawings, in which:

FIGURE 1 illustrates an electrical capacitor incorporating an improved dielectric material in accordance with the present invention;

FIGURE 2 illustrates a different embodiment of electrical capacitor incorporating the improved dielectric material;

FIGURE 3 illustrates still another form of electrical capacitor which may incorporate the improved dielectric material;

FIGURE 4 graphically illustrates the superior dissipation factor properties of a capacitor constructed in accordance with the invention;

FIGURE 5 is a graphical illustration of the improved capacitance stability of capacitors constructed in accordance with the invention; and FIGURE 6 is a graphical illustration of the stability of dissipation factor characteristics of the capacitors of the present invention with variation in frequency.

Referring now to the drawing, and particularly to FIGURE 1, there is shown a roll type capacitor comprising a pair of convolutely wound electrode foils 1 and 2 of suitable metal, e.g., aluminum, insulated from each other by separate sheets 3 and 4 of dielectric material of the composition hereinafter described. Electrical contact with electrode foils 1 and 2 is made by terminal leads 5, 6 of electrically conducting material which are applied to the respective foil electrodes and project from opposite ends of the wound capacitor section.

In a different form of capacitor as shown in FIGURE 2, the wound capacitor comprises a pair of convolutely wound dielectric films 7, 8, like dielectric films 3, 4 of FIGURE 1, but having metallized coatings 9, 10 respectively thereon serving as the capacitor electrodes. As shown, the margins at the opposite edges and the end of dielectric films 7, 8 are left free of metal coating to avoid the risk of short-circuiting between the electrodes of opposite polarity. Terminals 11, 12 are electrically connected to the metallized coating edges exposed at opposite ends of the roll by a metal connection 13 produced by a schooping, soldering or other suitable process, as well known in the art.

FIGURE 3 shows a capacitor assembly in which a wound capacitor section 14, such as the wound section shown in FIGURE 1 or FIGURE 2, is enclosed in a casing 15 containing a dielectric liquid, such as mineral oil, polymerized butenes, castor oil, silicone oil, or other known or suitable capacitor impregnant material. Tap straps 17, 18 connected within the capacitor section to electrodes of different polarity are respectively connected to external terminals 19, 20 suitably mounted on the cover of the casing.

The dielectric spacer material separating the capacitor electrodes is composed of a polyphenylene ether material constituted by self-condensation products of monohydric, monocyclic phenols. These products are obtained by reacting the phenols with oxygen using as the oxygen-carrying intermediate a solution comprising a basic cupric salt complex of a tertiary amine selected from the group consisting of aliphatic tertiary amines and cyclic tertiary amines. The general method of carrying out the oxidation process is to pass an oxygen-containing gas through a mixture of one or more monohydric, monocyclic phenols (referred to as hereinafter as "phenols") as starting material, in a solution also containing dissolved therein a complex comprising at least one basic cupric salt and at least one tertiary amine.

The polyphenylene ether products used in practicing the present invention and the methods of making the same are more fully disclosed in co-pending application Serial No. 212,128 in the name of A. S. Hay, filed July 24, 1962 and assigned to the same assignee as the present invention. The latter application is a continuation-in-part of application Serial No. 69,245, filed November 5, 1960, which in turn is a contiuation-in-part of application Serial No. 744,086 filed June 24, 1958, now abandoned, both of which are also assigned to the same assignee as the present invention. The disclosures of all the aforementioned applications are incorporated herein by reference.

The polyphenylene ethers employed in practicing the present invention are produced by reacting oxygen, in the presence of a tertiary amine and a cuprous salt soluble in the tertiary amine and capable of existing in the cupric state, with a phenol defined by the structural formula:

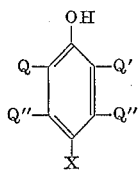

where X is a substituent selected from the group consisting of hydrogen, chlorine, bromine and iodine, Q is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of an aliphatic, tertiary α-carbon atom, and halohydrocarbonoxy radicals having at least two carbon atoms between the halogen atom and phenol nucleus and being free of an aliphatic tertiary α-carbon atom, Q' and Q'' are both the same as Q and in addition halogen, with the proviso that X must be halogen when Q and Q' are each substituents selected from the group consisting of aryl radicals, haloaryl radicals, hydrocarbonoxy radicals and halohydrocarbonoxy radicals. Preferbly, Q'' represents hydrogen. The term "free of a tertiary α-carbon atom" means that the terminal carbon atom of the aliphatic hydrocarbon substituent which is attached to the phenol nucleus (either directly if the substituent is hydrocarbon or halohydrocarbon or through the oxygen atom if the substituent is hydrocarbonoxy or halohydrocarbonoxy) has at least one hydrogen atom attached to it.

It will be seen that the phenols of the aforementioned formula have no more than one halogen in the ortho position, have a halogen in the para position when both substituents in the two ortho positions are aryl, haloaryl, hydrocarbonoxy, or halohydrocarbonoxy radicals, and have a reactive para position with respect to the phenolic hydroxyl.

When such phenols are oxidized to resins by the method described, the polyarylene ethers so produced will have repeating units that correspond to the structural formula

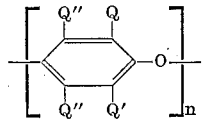

where Q, Q' and Q'' are as defined for the phenol starting material as shown previously, n is a positive integer representing the number of repeating units, and the oxygen atom of one unit is connected to the benzene nucleus of the adjoining unit. It will be understood that this repeating unit forms a long chain to provde a final molecular structure representing many of the repeating units linked together. The integer n is in the range of about 100 to 1500, or greater, and these are average values, since the resinous products are mixtures of polymers of different chain lengths. The oxidation process described is capable of producing polyarylene ethers having molecular weights of at least 10,000, and such resins represent polymers having at least 100 repeating units, i.e., n in the above formula is at least 100.

The preferred classes of phenols for making high molecular weight resins are those corresponding to the formula

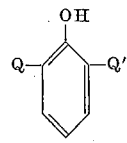

where Q and Q' are as previously defined and the three positions shown without substituents have a hydrogen atom attached to the ring carbon.

If it is desired to obtain very high molecular weight linear polyarylene ethers, it is necessary to have the oxidation reaction involve only the para position and the phenolic hydrogen. However, polyarylene ethers can be made having low and intermediate molecular weights by oxidizing phenols having only a reactive ortho position. If the oxidation is carried out with phenols which can react to both the ortho and para positions as well as the phenolic group, the polyarylene ethers are usually a mixture of polyarylene ethers with a three-dimensional or branched chain structure.

Thus, polymers may be formed wherein some ortho positions have participated in the polymer forming reaction either alone or with reaction also occurring in the para position to form branched polymers without any substantial cross-linking of the polymer. These polymers as well as the polymers which are coupled through only the para position may be represented by the formula

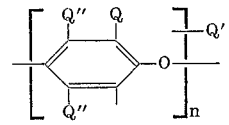

where n, Q, Q' and Q'' are as previously defined and the oxygen of one unit is attached directly to the benzene nucleus of the adjacent unit.

The very high molecular weight polyarylene ethers can be made with extremely high softening points, in the range of 250–300° C. or higher. Depending on the conditions under which they are made, they either remain thermoplastic under continued heating in vacuum at 250° C., or cure to an infusible state when they are no longer soluble in the usual organic solvents such as toluene, xylene, chloroform, nitro-benzene, etc., in which they are soluble prior to heat treating.

The type of products obtained by the described process is dependent on the phenol used as the starting reactant, the amine used in the catalyst system, the modifiers present, and the reaction conditions. For the purposes of the present invention the higher molecular weight polyphenylene ether products where the molecular weight is at least about 10,000 are preferred. The maximum molecular weight is limited only by the ability to fabricate and form the polymer material for the desired purposes.

Polyarylene ethers used as dielectric material for capacitors in accordance with the invention may be extruded or cast from solution to form thin films for this purpose. They may also be applied as dielectric coatings to the surfaces of electrode foils from solution or suspension, or by fluidized bed coating methods well known in the art. Thus, resin coated electrode foils may be provided wherein the dielectric resin coating is applied to the surfaces of each foil with exposed metal margins at opposite sides of the wound roll, as shown for example in Rosenberg Patent 2,995,688.

While the dielectric material is shown in FIGURES 1 and 2 used alone as a dielectric material, the synthetic resin sheet may be used in conjunction with other materials such as kraft paper and other types of dielectric sheets to provide a complex dielectric spacer system, particularly where the auxiliary spacer material is porous and used for the purpose of enabling improved distribution of impregnating liquids in capacitors. The polyarylene ether dielectric material may be used with other materials, such as sheet mica, or with fillers such as finely divided aluminum oxide or silica flour. If desired, the dielectric spacer material between capacitor electrodes may be in the form of paper or other porous insulating sheets such as glass cloth, asbestos, or textile cloth impregnated and/or coated with the described resin dielectric composition. The capacitors incorporating the described resin composition may be employed in dry form or impregnated with liquid dielectrics as shown in FIGURE 3, or impregnated with hardenable liquid dielectric materials of known or suitable type which are cured to provide a final capacitor unit with composite solid dielectric, as disclosed, for example, in Ruscetta et al. Patent 2,864,982.

The described dielectric films may have conducting layers deposited thereon by known metallizing processes to provide electrodes on their surface, either when in the form of self-supporting films as shown in FIGURE 2, or in the form of coatings on a metal base.

The following examples are given to illustrate the practice of the invention, it being understood that the invention is not intended to be limited in any way thereby.

Example I

Two batches of 50 grams of 2,6-dimethylphenol were oxidized in the presence of 1 gram of cuprous chloride and 50 ml. of pyridine. The phenol was not added until the other materials had been saturated with oxygen. The reaction temperature was maintained at 30° C. by partially immersing the reaction vessel in a constant temperature bath. At the end of 60 minutes, 102% of the theoretical amount of oxygen was absorbed that is required to oxidize all of the phenol to the polyarylene ether. At this time, the reaction mixture was poured into water to precipitate the product. It was washed with dilute aqueous hydrochloric acid until no more pyridine odor could be noticed and then with water. The polymer was digested six times in acetone, followed by dissolving in chloroform and precipitating in methanol. Both batches were combined by dissolving in chloroform, mixing and precipitating in methanol. This product is listed as Product A in Table I below. Product B was prepared in the same manner as Product A but the reaction was continued for 70 minutes in the case of the first batch which contained only 40 grams of phenol, and 90 minutes in the case of the second batch which contained 50 grams of the phenol. In both of these cases 107% of the theoretical amount of oxygen required to oxidize the phenols was absorbed. Product C represents a polymer made by a two step process. The procedure was the same as for Product A except 2.5 grams of cuprous chloride was used. At the end of 3.5 minutes approximately 50% of the theoretical amount of oxygen had been absorbed. The reaction was killed by adding enough hydrochloric acid to make the solution acidic. The polymer was extracted from the aqueous solution with benzene and washed with a 5% aqueous sodium hydroxide solution to remove any unreacted phenol. The benzene solution was washed with water and dried with a desiccant. The benzene was evaporated to isolate the polymer as a low molecular weight, brittle polymer. Twenty-nine grams of this low molecular weight polymer was dissolved in 620 ml. of pyridine containing 3.1 grams of cuprous chloride and oxidized for 1 hour by the same procedure as the first stage. Product C was isolated from the reaction mass by the same procedure as for Product A.

The physical and electrical properties of these three polymers are compared in Table I.

TABLE I.—PHYSICAL PROPERTIES OF POLY-(2,6-DIMETHYLPHENYLENE-1,4)ETHER

| | A | B | C |
|---|---|---|---|
| Intrinsic Viscosity | 0.50 | 0.97 | 1.45 |
| Approx. mol. wt. (by osm. pressure) | 20,000 | 45,000 | 70,000 |
| Optimum Pressing Temp. ° C | 230–250 | 250–270 | 270–290 |
| Density (pressed film) | 1.07 | 1.07 | 1.06 |
| Tensile Strength Ultimate at: | | | |
| 25° C. (p.s.i.) | 15,700 | 17,500 | 15,200 |
| 150° C | 6,700 | 12,500 | 15,900 |
| 175° C | 2,900 | 11,000 | 15,200 |
| 200° C | | 5,100 | 9,800 |
| Elongation percent at: | | | |
| 25° C | 72 | 81 | 64 |
| 150° C | 71 | 133 | 170 |
| 175° C | 53 | 167 | 230 |
| 200° C | | 140 | 200 |
| Electrical Properties 25° C. Diel. Constant (60 cycles) | 2.6 | 2.60 | 2.60 |
| Tan δ (60 cycles) | 0.0006 | 0.0007 | 0.0008 |
| D.C. Resistivity (ohm-cm.) | $1 \times 10^{18}$ | $6 \times 10^{17}$ | $1 \times 10^{18}$ |
| A.C. Resistivity (ohm-cm.) | $1 \times 10^{13}$ | $2 \times 10^{12}$ | $1 \times 10^{13}$ |
| 175° C. Diel. Const. (60 cycles) | 2.6 | 2.55 | 2.6 |
| Tan δ (60 cycles) | 0.0034 | 0.002 | 0.002 |
| D.C. Resistivity (ohm-cm.) | $9 \times 10^{13}$ | $2 \times 10^{13}$ | $9 \times 10^{14}$ |
| A.C. Resistivity (ohm-cm.) | $5 \times 10^{12}$ | $4 \times 10^{12}$ | $5 \times 10^{12}$ |

Films about 1.3 mils thick of the polymer material thus produced were made by casting from a chloroform solution and were employed as dielectric sheets in capacitor units, which were tested for stability of electrical properties, as described hereinafter.

Example II

Oxygen was passed for 10 minutes into a reaction mixture containing 5 grams of 2,6-dimethylphenol,

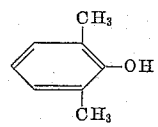

one gram of CuCl and 100 ml. of pyridine. During the course of the reaction the temperature rose to a maximum of 70° C. No water was removed during the coarse of the reaction. The product was precipitated by pouring the reaction mixture into about 500 mls. of dilute hydrochloric acid and was separated by filtration.

The product, poly-(2,6-dimethyl-1,4-phenylene)-ether, is characterized by recurring structural units of the formula:

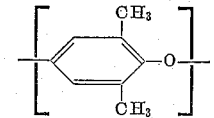

where the oxygen atom of one unit is joined directly to the phenyl nucleus of the adjacent unit.

It was produced in substantially quantitative yields.

This product had a molecular weight by light scattering in the range of 300,000–700,000 and did not melt at 300° C. The powder produced on precipitation could be molded, calendered, or extruded under pressure of 2,000 lbs./sq. inch, into a unitary piece at 240° C. Tough films were made from 10% solutions of the polymer in each of the following solvents, (1) benzene (2) toluene (3) xylene (4) tetrahydrofuran (5) pyridine, by spreading the solutions on a glass surface and removing the film after the solvent had evaporated.

Films produced of the resulting product were employed as capacitor dielectric sheets as in the foregoing example.

Example III

The following example illustrates the manner in which polyarylene ethers may be made from phenols having more than one reactive position. The general procedure was as in Example II as to the making up of the reaction mixture, passing in oxygen, and isolating the product. In some cases, the reaction had to be heated to initiate the reaction. Where a solid modifier was present, the solid was filtered from the solution before the polyarylene ether was precipitated. The results are summarized in Table II:

TABLE II

| Phenol (g.) | CuCl, g. | Amine (g.) | Solvent, ml. | Modifier | Temp. ° C. | | Time | Intrinsic Viscosity |
|---|---|---|---|---|---|---|---|---|
| | | | | | Start | Max. | | |
| Phenol (75) | 1 | 2-methyl-6-undecyl pyridine (5) | s-Tetrachloroethane (150) | 0.1 g. picric acid | 70 | -------- | 310 | 0.2 |
| 2-methylphenol (5) | 1 | 2-(5-nonyl) pyridine 6.2 g. | Nitrobenzene (100) t-amyl alcohol (10) | -------- | 26 | 50 | 180 | 0.39 |
| o-Phenylphenol (10) | 1 | 2-benzylpyridine (5.1) | Nitrobenzene (125) | -------- | 150 | -------- | 155 | 0.11 |
| o-Chlorophenol (15) | 1 | 2-amylpyridine (3) | Tetrachloroethane (125) phenyl-Cellosolve (65) | 5% platinum on carbon. | 50 | -------- | 145 | 0.24 |

Films made of these polymers may be incorporated as dielectric spacer material between electrode elements to form electrical capacitors, as in the foregoing examples.

FIGURE 4 illustrates the remarkably improved dissipation factor properties of capacitors incorporating the described dielectric material as compared to those having known materials used heretofore as capacitor dielectric components. Curve A represents a polyester, poly(ethylene terephthalate), known commercially as Mylar; Curve B represents kraft paper impregnated with chlorinated diphenyl, a commonly used capacitor dielectric material; curve C represents polypropylene resin dielectric material; and curve D represents the polyphenylene ether as employed in the present invention. As will be seen from the graph, wherein the dissipation factor in percent is plotted against temperature in degrees centigrade, the dissipation factor of capacitors having the polyphenylene ether dielectric remains relatively low over a wide temperature range from below −40° C. to nearly 180° C., in marked contrast to capacitors having the known materials which undergo wide variation in dissipation factor over this temperature range and show typically sharp rises in dissipation factor at the higher temperature levels.

FIGURE 5 shows a comparison of capacitors having the polyphenylene ether dielectric film employed in the invention with capacitors incorporating known materials, in terms of stability of capacitance over a wide temperature range. In the graph, the percent of room temperature capacitance is plotted against the temperature in degrees Centigrade and the curves represent the respective materials as designated and described above in connection with FIGURE 4. It will be seen from the graph that the variation in capacitance characterizing capacitors with the polyphenylene ether dielectric employed in the present invention is considerably less than that of the capacitors with Mylar and polypropylene resin dielectric materials, over a temperature ranging from below −50° C. to above 150° C.

FIGURE 6 compares capacitors having known dielectric materials with capacitors having the polyphenylene ether dielectric in terms of variation of dissipation factor with frequency. In the graph, dissipation factor in percent is plotted against the frequency in kilocycles, and the curves are designated as follows: Curve A represents capacitors with kraft paper impregnated with mineral oil; curve B represents those with polypropylene film dielectric; curve C represents those with a ceramic dielectric composed of titania; and curve D represents capacitors with the polyphenylene ether dielectric as employed in the present invention. As will be seen from the graph, the dissipation factor of capacitors with the polyphenylene ether dielectric is remarkably stable over a wide range of frequency and considerably better in this respect than any of the other capacitors using the known dielectrics. This characteristic makes the capacitors of the present invention eminently suited for application to electronic and other devices designed to operate under widely different frequencies.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising a pair of electrodes separated by dielectric material, said dielectric material comprising a polyphenylene ether having a repeating structural unit of the formula

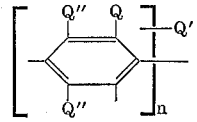

wherein the oxygen atom of one unit is connected to the benzene nucleus of the adjoining unit, $n$ is a positive integer and is at least 100, Q is a monovalent substituent selected from the group consisting of hydrogen, hydrocarbon radicals free of a tertiary α-carbon atom, halohydrocarbon radicals having at last two carbon atoms between the halogen atom and phenol nucleus and being free of a tertiary α-carbon atom, hydrocarbonoxy radicals being free of a tertiary α-carbon atom, and halohydrocarbonoxy radicals having at least two carbon atoms between the halogen atom and phenol nucleus and being free of a tertiary α-carbon atom, Q' and Q'' are both monovalent substituents which are the same as Q and in addition, halogen.

2. An electrical capacitor comprisiing a pair of wound electrodes of metallic foil, said metallic foil electrodes being separated by dielectric films comprising a polyphenylene ether as defined in claim 1.

3. An electrical capacitor comprising a pair of electrodes separated by films of dielectric material, at least one of said electrodes being in the form of a metallized coating on the dielectric material, said dielectric material comprising a polyphenylene ether as defined in claim 1.

4. An electrical capacitor comprising spaced conductors of opposite polarity and a composite dielectric material therebetween comprising porous dielectric sheet matrial combined with a polyphenylene ether composition as defined in claim 1.

5. An electrical capacitor comprising a pair of electrodes separated by dielectric material, said dielectric material comprising a polyphenylene ether as defined in claim 1 and being combined with a dielectric fluid.

6. An electrical capacitor comprising spaced conductors of opposite polarity and a composite dielectric material therebetween comprising porous dielectric sheet material combined with a synthetic resin dielectric material, said composite dielectric material being impregnated with a dielectric fluid, said synthetic resin dielectric material comprising a polyphenylene ether as defined in claim 1.

7. An electrical capacitor as defined in claim 1, having a polyphenylene ether dielectric wheren Q and Q' are each an aliphatic hydrocarbon radical free of a tertiary α-carbon atom and Q" is hydrogen.

8. An electrical capacitor as defined in claim 1 having a polyphenylene ether dielectric wherein Q is an aliphatic hydrocarbon radical free of a tertiary α-carbon atom, Q' is a halogen and Q" is hydrogen.

9. An electrical capacitor as defined in claim 1 having a polyphenylene ether dielectric wherein Q is an aliphatic hydrocarbon radical free of a tertiary α-carbon atom, Q' is an aryl radical and Q" is hydrogen.

10. An electrical capacitor as defined in claim 1 having a polyphenylene ether dielectric wherein Q is a methyl and Q' is phenyl.

11. An electrical capacitor as defined in claim 1 having a polyphenylene ether dielectric wherein Q is an aryl radical, Q' is a halogen and Q" is hydrogen.

12. An electrical capacitor as defined in claim 1 having a polyphenylene ether dielectric wherein Q is phenyl and Q" is chlorine.

13. An electrical capacitor as defined in claim 1 having a polyphenylene ether wherein Q is an aliphatic hydrocarbon radical free of a tertiary α-carbon atom, and Q' and Q" are hydrogen.

14. An electrical capacitor comprising a pair of electrodes separated by dielectric material comprising a polyphenylene ether, said polymer having a molecular weight of at least 10,000.

15. An electrical capacitor comprising a pair of electrodes separated by dielectric material comprising a poly-(2,6-dimethylphenylene-1,4) ether having a molecular weight of at least 10,000.

16. An electrical capacitor comprising a pair of electrodes separated by dielectric material comprising a poly-(2-chlorophenylene) ether said polymer having a molecular weight of at least 10,000.

17. An electrical capacitor comprising a pair of electrodes separated by dielectric material comprising a poly-(2-methylphenylene) ether, said polymer having a molecular weight of at least 10,000.

18. An electrical capacitor comprising a pair of electrodes separated by dielectric material comprising a poly-(2-phenylphenylene) ether, said polymer having a molecular weight of at least 10,000.

References Cited by the Examiner

UNITED STATES PATENTS

| 2,995,688 | 8/1961 | Rosenberg | 317—258 |
| 3,133,899 | 3/1964 | Kwiatek et al. | 260—47 |

FOREIGN PATENTS

| 1,234,336 | 10/1960 | France. |
| 930,993 | 7/1963 | Great Britain. |

OTHER REFERENCES

Birks, J. B., Modern Dielectric Materials, Heywood and Co., London, 1960, pp. 11, 21 to 24, QC585B5.

LEWIS H. MYERS, *Primary Examiner.*

JOHN F. BURNS, LARAMIE E. ASKIN, *Examiners.*

E. GOLDBERG, *Assistant Examiner.*